United States Patent [19]

Neary

[11] 3,727,282

[45] Apr. 17, 1973

[54] SEMICONDUCTOR HANDLING APPARATUS

[75] Inventor: Charles A. Neary, Martinsville, N.J.

[73] Assignee: Burroughs Corporation, Detroit, Mich.

[22] Filed: Feb. 5, 1970

[21] Appl. No.: 8,851

[52] U.S. Cl. ....................... 29/200 D, 29/413, 225/2, 225/96.5, 29/203 R

[51] Int. Cl. ............................................ B23p 19/00

[58] Field of Search .......................... 225/2, 96.5, 96; 29/424, 413, 203, 222, 269, 200 D

[56] References Cited

UNITED STATES PATENTS

| | | | |
|---|---|---|---|
| 3,182,873 | 5/1965 | Kalvelage | 225/2 |
| 3,448,510 | 6/1969 | Bippus | 29/413 |
| 3,461,537 | 8/1969 | Lotz | 29/413 |
| 3,493,155 | 2/1970 | Litant et al. | 225/96.5 |
| 3,507,426 | 4/1970 | Bielen | 225/2 |

*Primary Examiner*—Thomas H. Eager
*Assistant Examiner*—V. A. DiPalma
*Attorney*—Kenneth L. Miller and Charles S. Hall

[57] ABSTRACT

A method and apparatus for handling semiconductor crystals. The method includes securing a large semiconductor wafer to a deformable plastic carrier, scribing and breaking the wafer into a plurality of small crystals, and stretching the carrier to separate the individual crystals while maintaining their orientation. The apparatus includes a hollow cylinder, a piston and a plug seated on the piston; the carrier having the wafer thereon is clamped to the cylinder and the piston and plug are moved vertically to stretch the carrier. Then the carrier may be secured to the plug for further utilization.

6 Claims, 7 Drawing Figures

INVENTOR
CHARLES A. NEARY

BY Jerald J. Schneider
AGENT

FIG. 5.
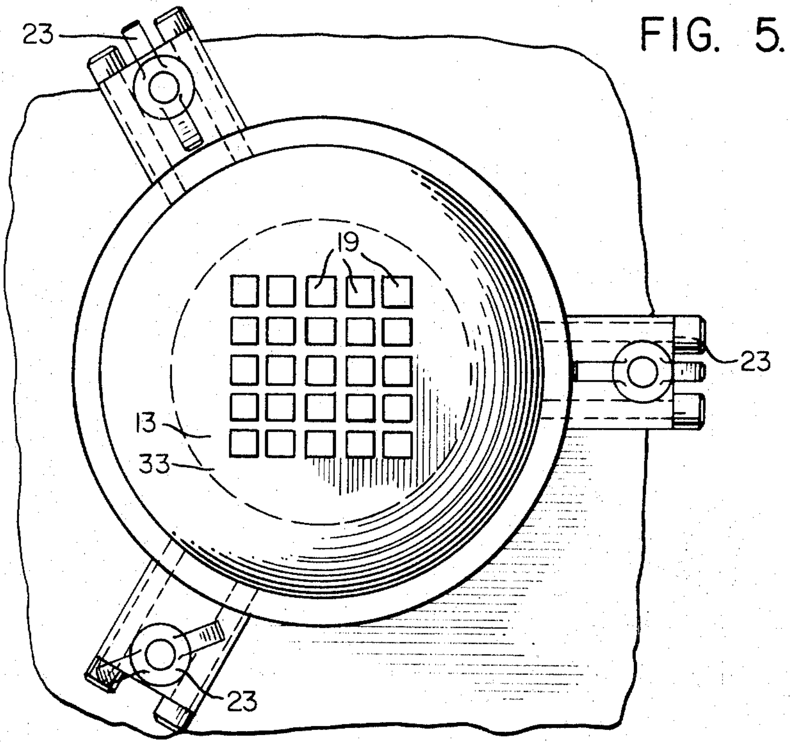
FIG. 6.
FIG. 4.
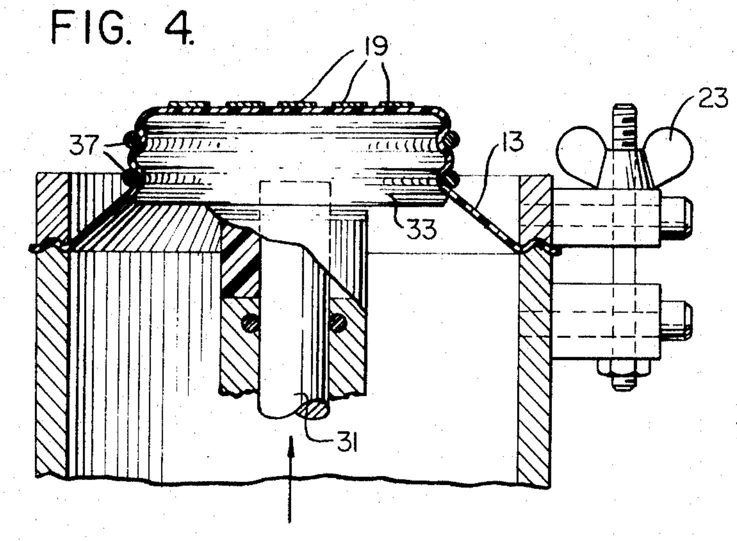
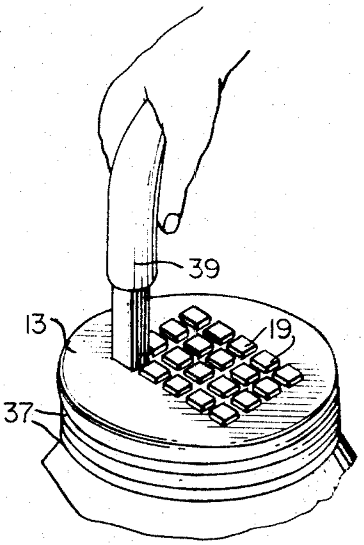
FIG. 7.
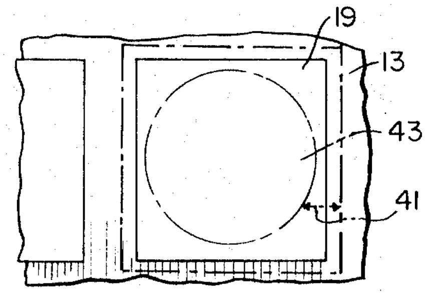
INVENTOR
CHARLES A. NEARY
BY Jerold J. Schneider
AGENT

SEMICONDUCTOR HANDLING APPARATUS

BACKGROUND OF THE INVENTION

In the mass production of semiconductor crystals various techniques are used to obtain crystals which are sufficiently small to be included in micro-miniature circuits. However, two general types of problems exist; the need to test the individual crystals and the difficulty in handling the individual crystals.

Prior to the novel method and apparatus of the present invention, the mass production of semiconductor crystals included the steps of placing a large wafer on a carrier sheet, scribing or cutting the wafer to define the individual crystals or chips, bending the wafer and carrier over a form or arbor to break the wafer into the individual crystals, and stripping the crystals off the carrier by a knife-like apparatus. This is shown, for example, in U.S. Pat. No. 2,970,720, Schwarz, and is analagous to glass cutting wherein the glass is first scored by a hand tool and then broken along the score line by bending the glass over a straight edge.

This method, while satisfactory in the glass art, is inherently crude for use in the manufacture of semiconductor chips. In addition, in order to prevent breaking of the chips except at the scored lines, the arbor or mandrel usually has a series of ridges or protrusions which are spaced to coincide with the spacing of the scored lines. This is also seen in the aforementioned patent to Schwarz. Therefore, with various sized chips, a plurality of mandrels would be necessary. The use of a knife-like edge for stripping the individual crystals from the carrier can damage the individual crystal or can cut into the carrier. Furthermore, the knife-like edge will eventually become worn and must be sharpened or replaced.

Besides the additional equipment needed for various size chips, the prior art presents the above-mentioned problem of excess handling. Furthermore, the prior art does not facilitate the testing of the individual crystals or chips without additional handling. For example, in the aforementioned patent to Schwarz, the individual crystals are deposited into a trough and must be individually removed by some type of handling tool to provide the quality control testing which is necessary in the mass production of any semiconductor device. This requires additional handling which may damage the crystals and does not provide for convenient storage of the crystals.

SUMMARY OF THE INVENTION

Accordingly, with these prior art problems in mind, the invention contemplates the solution of these problems by providing a new and improved method and apparatus for the manufacture and handling of semiconductor crystals including minimizing handling of the individual crystals during the manufacture and testing process.

In addition, it is an object of the present invention to reduce the number of handling components necessary in the manufacturing process.

It is a further object of this invention to provide for convenient storage of the individual chips.

It is another object to maintain the orientation of the individual chips during the manufacture and handling of semiconductor devices.

These and other objects are accomplished in a method and apparatus for handling semiconductor crystals wherein a large wafer is secured to a carrier sheet and the wafer is diced into a plurality of individual crystals or chips which are separated by stretching the carrier. During the stretching operation the orientation of individual crystals is maintained to permit the crystals to be individually tested for quality control or other purposes. The apparatus includes a hollow cylinder having a piston with a removable plug seated thereon. The carrier is attached to the cylinder and the piston and plug are raised to stretch the carrier and separate the crystals. The carrier may then be fastened to the plug and the carrier and plug removed for testing, storage or further processing of the crystals.

BRIEF DESCRIPTION OF THE FIGURES

The foregoing objects and advantages of our invention, together with other advantages which may be attained by its use, will be apparent from the following detailed description of the invention read in conjunction with the drawings. In the drawings, wherein like numbers designate corresponding elements:

FIG. 4 is a partial sectional view of FIG. 3 after the piston has been raised;

FIG. 5 is a top view of FIG. 4;

FIG. 6 illustrates a vacuum or suction tool as applied to remove an individual device from the carrier; and FIG. 7 illustrates the size relationship between the individual chips and the opening of the suction tool.

DESCRIPTION OF THE PREFERRED EMBODIMENT

Figures 1, 2, 3:
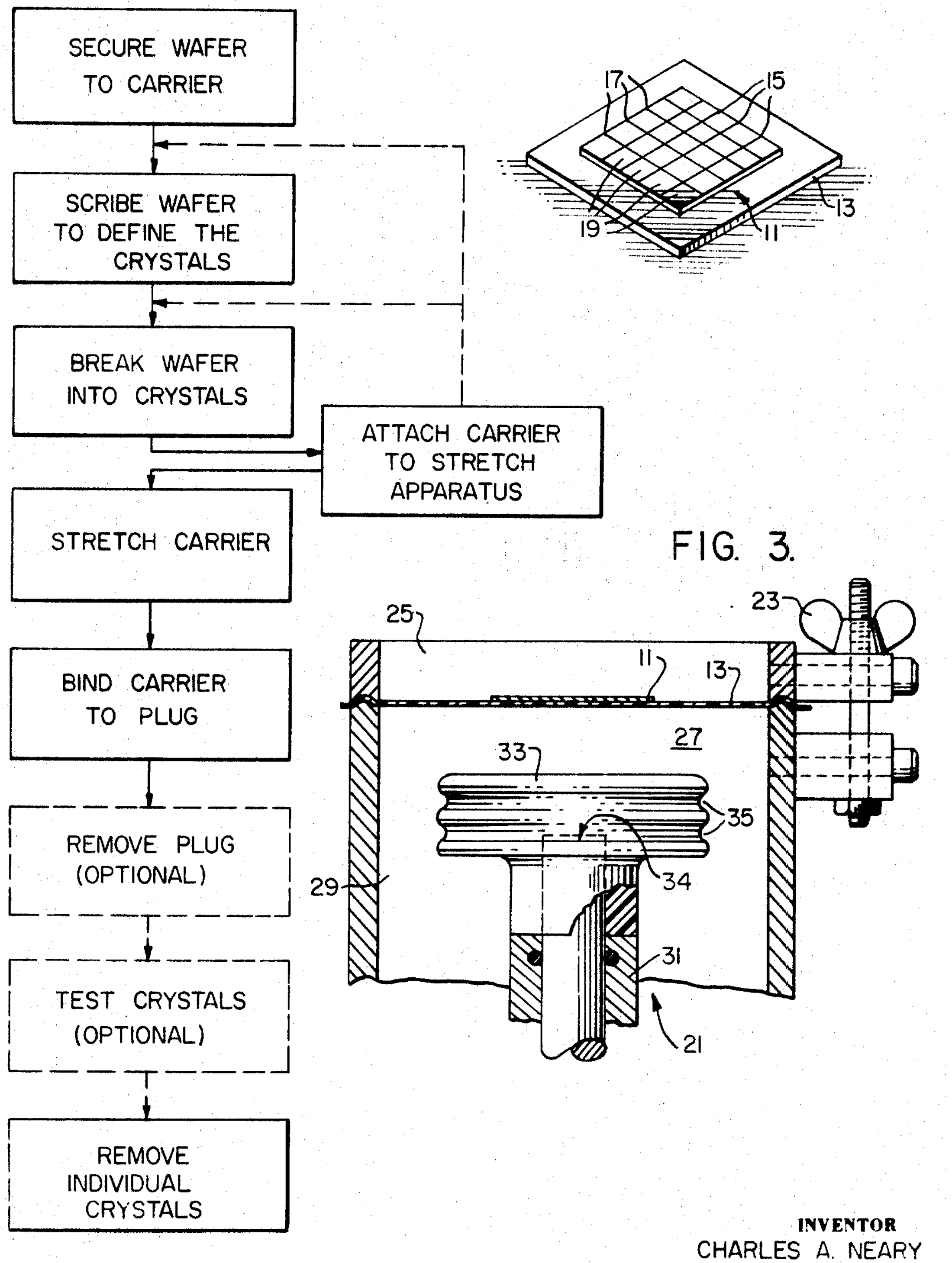
FIG. 1 is a flow chart of the method of the present invention.
FIG. 2 is an illustration of a wafer affixed to a carrier sheet.
FIG. 3 is a partial sectional view of the hollow cylinder, piston and plug used to stretch the carrier.

Referring now to the drawings, the method and apparatus of the invention will be explained. FIG. 1 is a flow chart illustrating the steps in the method. The various steps may be understood by referring to FIGS. 2 – 7.

The initial step is to secure a large semiconductor wafer 11 to a deformable carrier sheet 13. The carrier, which may be a polyvinylchloride or elastic material, may contain an adhesive face to which the large wafer may be secured. Alternatively, the wafer may be cemented to the carrier. In addition, a plastic film made by Dayco Corp., has proven satisfactory as a carrier and the wafer may be affixed thereto by heat and pressure.

Next, the wafer 11 is scribed or scored with a plurality of lines 15, 17 to define a plurality of individual crystals, chips of dice 19. Any desired shape crystal 19 can be scribed; the lines 15, 17 need not be horizontal and vertical as shown but may take any desired configuration as taught by U.S. Pat. No. 3,169,837, Morass et al. The precise apparatus for scribing the wafer 11 is wellknown and does not form a part of the present invention.

The next step is to break the wafer 11 along the scribe lines 15, 17 into individual chips 19. This may be accomplished by pressing down on the wafer with a roller or by flexing the carrier over a mandrel.

Referring now to FIG. 3, the carrier 13 having the broken wafer thereon is attached to the stretch apparatus 21. To accomplish this, the wing nuts 23 (only one is shown in FIG. 3) are removed and the upper portion 25 of hollow cylinder 27 is removed. Carrier 13 with wafer 11 thereon is placed over the open top of the lower portion 29 of hollow cylinder 27. Upper cylinder 25 is replaced and the wing nuts 23 are tightened. This clamps carrier 13 between the upper and lower cylinder walls.

The stretch apparatus 21 includes a piston 31 having a lug 33 seated thereon. A stud 34 is located at the top of piston 31 and plug 33 has an opening in the lower surface to accept the stud. Plug 33, which may be of nylon, is force fit on stud 34. The piston, stud and plug are generally circular in cross-section and the plug has notches or grooves 35 around its periphery.

As shown in FIG. 4, in order to stretch the carrier 13 and separate the individual crystals 19, the piston 31 is actuated (moved vertically upwards) either manually or automatically until the desired amount of separation is obtained. When the piston pushes up on carrier 13, it causes the carrier to stretch in all directions because of the circular cross-section of the plug and piston. Therefore, the crystals or chips 19 are separated from each other in all directions with the space between the individual crystals remaining proportional. Therefore, the relative orientation of the individual crystals remains constant.

FIGS. 4 and 5 illustrate the stretching apparatus after the piston 31 has been actuated. As seen in the top view (FIG. 5) the individual crystals 19 have been separated. Next, the carrier 13 is bound to the plug 33. To accomplish this, elastic bands 37 may be used; one band in each notch or groove 35. Of course, other satisfactory structure is available to bind the carrier to the plug, the essential requirement is to prevent the carrier from returning to its original (unstretched) size prematurely.

There are now several alternatives available according to the principles of this invention. If desired, the plug 33 with the carrier 13 attached thereto by elastic bands 37 may be removed from piston 31 by releasing the wing nuts 23 and pulling up on the plug to overcome the force fit of stud 34. The plug having the separated chips secured to the carrier may be stored or moved along the production line for quality control and/or characteristic testing.

In order to obtain the optimum benefit of this invention, the above-recited structure or its equivalent should be used. However, it must be realized that if the user never intends to remove the plug, the plug and stud can be omitted and just the piston used. Then the piston and cylinder combination can be stored and/or moved along the production line. Similarly, when just a piston is used, the sides of the piston may contain notches for receiving the elastic bands.

When it is desired to either test or utilize the individual crystals, a hand tool 39, shown in FIG. 6, may be used to remove the crystals from the plug and carrier unit. Preferably a vacuum or suction tool is used. In order to provide optimum efficiency, it has been found that the area of the mouth or opening of the suction tool 39 should be about 80 percent of the area of an individual crystal 19. As shown in FIG. 7, the inner and outer dimensions of the wall 41 of tool 39 should be such that the opening 43 approximates 80 percent of the area of crystal 19.

Various modifications of the method and apparatus may be made without departing from the spirit and scope of this invention. For example, as seen by the dotted lines in the flow chart of FIG. 1, the carrier containing the wafer thereon may be attached to the stretch apparatus after the first or second step instead or after the third step. Similarly, various types of clamps may be used in lieu of the wing nuts and in lieu of the elastic bands. Therefore, this invention should be limited only by the scope of the following claims.

What is claimed is:

1. Apparatus for handling a plurality of semiconductor dice mounted on a deformable carrier, to be separated from each other while maintaining their relative orientation comprising:

a solid member having an aperture therein;

means for temporarily securing said deformable carrier to said solid member with said dice positioned over the aperture;

a piston-like member having a plug with grooving about its exterior surface removably secured thereto for advancing through the aperture against said deformable carrier and stretching said carrier to separate said dice from each other while maintaining their relative orientation on the carrier; and an elastic band which fits about said plug and rests in said grooving for attaching said deformable carrier with its dice to said plug after said carrier is stretched by said plug.

2. Apparatus according to claim 1 wherein said solid member is tubular in configuration and said aperture is an opening at one end of said tubular member, and wherein said piston-like member, including said plug, is located within said tubular member and mounted for movement axially along the interior of said tubular member.

3. Apparatus according to claim 2 wherein said means for temporarily securing the deformable carrier constitutes means for clamping the deformable carrier to said tubular member.

4. Apparatus according to claim 2 wherein said tubular member includes two cylindrical portions which are disposed coaxially, and wherein said means for temporarily securing said deformable member constitutes means for clamping said cylindrical sections together with the deformable member disposed between them.

5. Apparatus according to claim 2 wherein said plug includes a flat contact surface substantially parallel to the surface of said deformable carrier occupied by said dice when said carrier is in an unstretched condition.

6. Apparatus for handling a plurality of semiconductor dice mounted on a deformable carrier, to be separated from each other while maintaining their relative orientation comprising:

a stationary solid member having an aperture therein;

means for temporarily securing said deformable carrier to said solid member with said dice positioned over the aperture;

a piston-like member for advancing through the aperture;

a plug removably attached to said piston-like member for movement with said piston-like member through the aperture, against said deformable carrier, to stretch said carrier and separate said dice from each other while maintaining their relative orientation on the carrier; and means for retaining said deformable carrier bound to said plug, said means being adapted to be applied after said carrier is stretched by said plug; whereby said plug may be detached from the piston-like member and removed from the aperture with the carrier, holding the separated dice, fastened thereto.

* * * * *